Sept. 26, 1961 N. M. EMSLIE ET AL 3,001,789

CARD HANDLING APPARATUS

Filed May 14, 1959 2 Sheets-Sheet 1

INVENTORS
FRANK J. REED
NORMAN M. EMSLIE
BY
Carl H. [signature]
AGENT

CARD HANDLING APPARATUS

Filed May 14, 1959 2 Sheets-Sheet 2

INVENTORS
FRANK J. REED
NORMAN M. EMSLIE
BY
Carl H. Synnestvedt
AGENT

United States Patent Office 3,001,789
Patented Sept. 26, 1961

3,001,789
CARD HANDLING APPARATUS

Norman M. Emslie, Yardley, and Frank J. Reed, Philadelphia, Pa., assignors to Philco Corporation, Philadelphia, Pa., a corporation of Pennsylvania
Filed May 14, 1959, Ser. No. 813,147
6 Claims. (Cl. 271—88)

This invention relates generally to card handling apparatus and more particularly to improved card stacking means.

While of broader applicability, this invention is particularly useful in card handling operations utilizing large quantities of cards moving at high translational speeds. The invention will be illustrated and described in relation to this particular use.

A common shortcoming of present day card handling apparatus is their inability to accurately provide for the variation in card storage capacity required during the process of card stacking in order to insure proper loading.

In the majority of card stacking devices the card storage space is meted out in response to card weight. This is generally an unsatisfactory method of accumulating and stacking cards in that the weight of cards is variable and results in providing a card storage volume unrelated to actual card-storage requirements. This is particularly true in high-speed computer-type operations which utilize cards perforated in accordance with the quantity of information contained thereon. Thus the weight of a card which is substantially perforated is only approximately ⅔ that of a card containing only one or two bits of information. Consequently, a machine utilizing weight responsive means to control the allocation of storage space may provide either too much or too little storage capacity to properly accommodate the cards being accumulated.

Another, but equally inadequate card-handling technique is to regulate card storage capacity in accordance with the average number of cards normally found to occupy a unit length. Because of the variation in card thickness this method is also unreliable and can result in either bunching of the cards, resulting in card damage, or in loosely packed cards lacking the required orientation. This problem is severely aggravated by computer type processing which requires an influx of vast quantities of information at high rates of speed thus necessitating the use of tremendous numbers of cards at high transport velocities. The large quantity of cards required makes the problem of variation in card thickness acute while the speed of card transport makes imperative proper card registration, if efficient and effective card utilization is to be realized.

Accordingly, it is a general object of this invention to provide card stacking apparatus which overcomes the limitations of prior art devices and which is both inexpensive and simple in operation and provides self regulating card-storage means directly responsive to actual card storage requirements.

It is a more specific object of the present invention to provide card-stacking apparatus of variable storage capacity controlled independently of card weight and individual card thickness.

It is a further and particularized object of this invention to provide card stacking apparatus having variable card storage capacity which is directly responsive to the cumulative thickness of cards being stacked and which employs unique card sensing means of improved sensitivity and control.

A still further object of this invention is to provide card stacking apparatus capable of handling cards traveling at high transport velocities with minimal card damage and with optimum uniformity of packaging.

These and other objects and features of the present invention will be apparent from a consideration of the following detailed description taken in conjunction with the accompanying drawings, in which.

This invention, in essence, relates to novel card stacking apparatus having self adjustable card receiving capacity which is automatically responsive to the varying, gross volumetric demand of cards being accumulated, thereby insuring uniform and orderly stacking of cards independently of their cumulative weight or individual thickness.

Figures 1, 2, 3, 4:
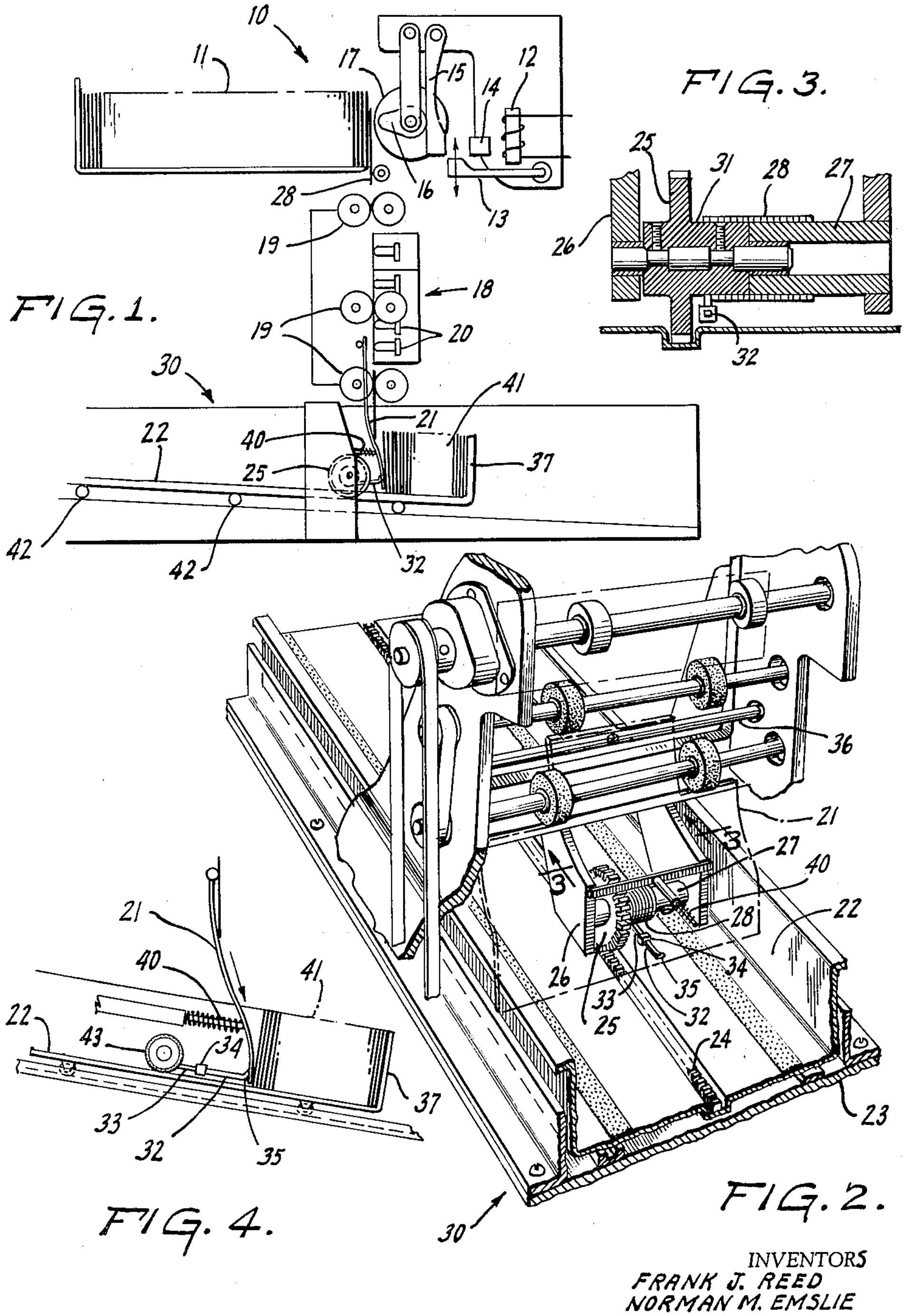
FIGURE 1 is a schematic, elevational view depicting a high-speed card reader of conventional design utilizing card handling apparatus embodying features of the present invention.
FIGURE 2 is a perspective view showing a preferred form of card stacking apparatus.
FIGURE 3 is a fragmental section showing the detailed construction of the card sensing means as exposed by the medial cutting plane 3—3 shown in FIGURE 2.
FIGURES 4 through 6 illustrate alternative embodiments of the invention.

Referring to FIGURE 1, the invention is depicted, for exemplary purposes, as incorporated in a high speed card reader 10 of the type typically employed in conjunction with data processing equipment for the translation of information into a computer or buffer memory. Operation of this mechanism consists of inserting a stack of cards 11 into the feed tray of the machine, each card being perforated in accordance with the quantity of information contained thereon. To initiate reading, cards are individually peeled from the face of this stack by energizing solenoid 12. This pulls the interposer 13 into interference relation between the fixed stop 14, and the depending flexible arm 15. This action prevents movement of arm 15 by the eccentric 16 carried by the continuously rotating feed roller 17 resulting in camming of the feed roller into engagement with the card stack 11 each revolution of the roller. Cards are thus ejected into the electronic reading station 18 for high speed transport therethrough by powered conveyor rollers 19. Located within the reading station are banks of photodiodes 20 arranged to photoelectrically sense the coded information contained on the passing cards and to translate this information into more convenient storage form, such as for example, onto magnetic or wire record media, for ultimate use by a computer. A typical reading speed for present day machines is in the range of approximately 2000 cards per minute. On emergence from the reading station the cards strike the pivotally mounted contoured plate 21 and are deflected into the receiving bin or tray 22 where they are automatically stacked for future use.

In particular accordance with the present invention card stacking is accomplished by means of the unique apparatus illustrated in FIGURE 2. The preferred practice is to mount the receiving tray 22 for gravitational movement down an inclined ramp 23 and to provide the tray with some type of brake, as for example a toothed bar or rack 24 which is lockingly engaged by a clutch-actuated braking pinion 25. The pinion 25 is freely journalled between the support wall 26 and the fixed tubular member or collar 27, the constructional details being shown in FIGURE 3. Locking this otherwise freely rotatable pinion to the fixed collar 27 is a helical, or wrap spring clutch 28. The clutch spring in its normally seated position is designed to permit the pinion to rotate freely in a clockwise direction, as viewed from the left in FIGURE 2, while preventing its counterclockwise rotation. The tray 22 may accordingly be easily installed in the receiving station 30 by placing the tray on the ramp 23, engaging the tray rack 24 and braking pinion 25 and pushing the tray uphill until the tray is positioned at the desired location. On release of the tray, the clutch escapement will resist the tray's tendency to gravitate preventing its downward movement. Controlled release of the clutch for the purpose of incrementally advancing the tray to increase its card storage capacity is accomplished by radially expanding the coiled loops of the spring 28 disposed about the pinion hub 31 (see FIGURE 3) allowing movement of pinion 25. One construction is to use a spring attachment or sensing element 32 one end of which is attached to a coil spring end 33 by means of a lock nut coupling 34, the sensing end of the finger terminating in an upstanding tab 35 abutting a rear wall portion of the deflecting plate 21. This plate is mounted on a pivotable bar 36 and on deflection of the plate by cards accumulating between it and the tray front 37, the sensing element 32 is progressively pushed backward uncoiling the spring 28 and, after sufficient unwrapping movement of the clutch spring has taken place, permitting a predetermined gravitational advance of tray 22. Incremental forward movement of the tray allows the deflecting plate 21 to return to its initial starting position where it remains until further card accumulation again displaces the plate backwards actuating the spring clutch to permit further tray advance. This process repeats itself until all the cards are transferred from the insertion station 11 to the receiving station 30. By proper selection of clutch spring parameters and deflection plate geometry the tray's response may be made as sensitive as desired. The system, if necessary, may be made responsive to the weight of a single card, the impingement of a freely falling card against the deflecting plate being sufficient to activate the clutch mechanism. One way this may be accomplished is by increasing the moment arm through which the activating force operates, by increasing the distance between the deflecting plate's point of pivotation and the point of card impact. To insure a minimum recovery time for such a system the plate's inertia should be made as small as is consistent with structural strength thereby optimizing the system's operational speed.

To hold the cards in an upright position during stacking the deflecting plate 21 is urged into engagement with the card stack by a spring biased plunger 40. While this arrangement is not indispensible to the proper functioning of the mechanism it is preferred, and provides a system which is more predictably sensitive to the ingress of cards and insures their orderly and uniform packaging. When the cards strike the contoured plate 21 they are deflected towards the card stack 41 the plate serving to both control the trajectory of the card as it passes into the tray and to partially dissipate its kinetic energy to prevent damage on its impact with the tray and other cards. As the card wedges itself between the deflecting plate and the card stack, it causes pivotation of the plate, pushing the card-sensing element 32 backwards releasing the clutch spring. This action radially expands the coils of the spring clutch, unlocking the pinion from the fixed sleeve member 27 permitting incremental advance of tray 17. This provides increased card storage capacity in direct response to actual storage demand. Through means of this novel apparatus the cards are automatically arranged within the tray in a uniform, precisely aligned stack. To eliminate the expense of separate drive means, the tray is desirably positioned on an incline so that when free to move it will gravitate to positions of increasing card storage capacity. To facilitate movement of the tray when unlocked from the pinion-clutch brake the tray is mounted on antifriction bearings 42. We have found that an incline having a slope of anywhere from 5–20° provides satisfactory tray movement.

FIGURE 4 depicts an alternative embodiment in which the pinion-rack brake has been replaced by a frictionally surfaced wheel 43 positioned for contact with the tray bottom and designed to prevent tray movement except on release of the wrap spring in the manner indicated.

Figure 5:
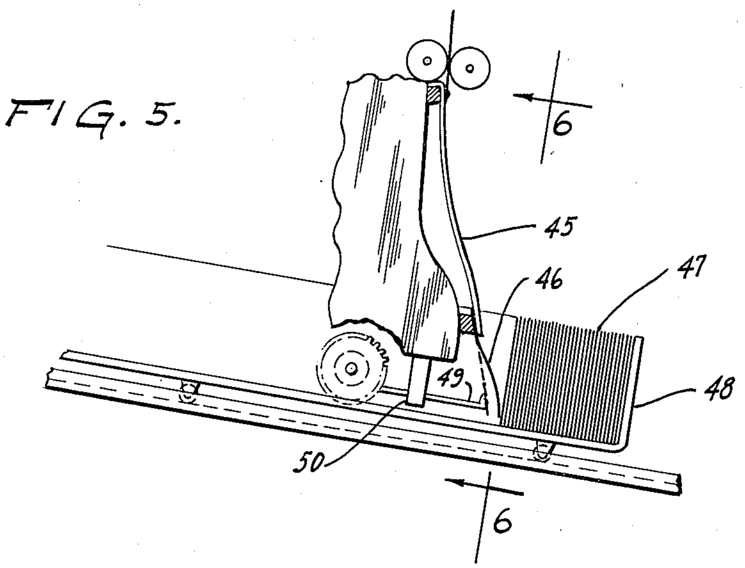
Figure 6:
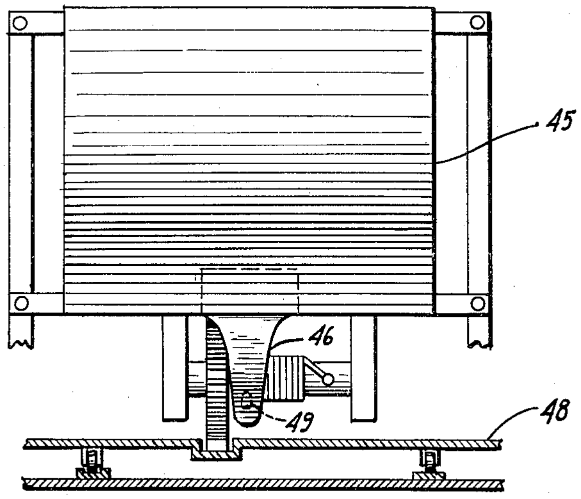

One technique for increasing card receiving sensitivity and speed of operation is to separate the card deflecting and sensing functions. This approach enables considerable reduction in the mass of the moving parts permitting extremely high speed operation. It should be understood in this regard that the card-deflecting plate is not an essential part of the invention and may be dispensed with entirely in certain applications, the cards in such cases being fed directly into the receiving bin. The arrangement shown in FIGURES 5 and 6 is one manner of accomplishing this separation of functions. In this embodiment the deflecting plate 45 is rigidly anchored at top and bottom to the frame of the machine thereby insuring a fixed and undeviating feed slope for cards entering the storage area. Attached to the lower end of this plate is a deflectable member such as a light leaf spring 46, positioned to sense the build-up of cards. When desirable this spring may also serve to hold the stack of cards 47 in fixed orientation within the receiving bin 48. The deflectable blade 46 may be positioned initially in spaced relation to the clutch actuating arm or plunger 49, shown in FIGURE 5, slidably supported within bushing 50. This arrangement allows a predetermined build up of cards before the clutch is triggered to permit tray advance. This built-in time delay can be easily eliminated to provide a system which is responsive to the immediate demand of cards being stacked by simply initially placing the actuating arm 49 and deflectable plate 46 in contact. Moreover, by suitably positioning the leaf spring 46 in interference relation with the incoming cards there is provided a spring loaded gate through which the cards must pass on their way into the receiving tray. By utilizing a spring having the requisite flexural characteristics the speed of card entry may be precisely attenuated. If system sensitivity or other reasons make it unfeasible to use the sensing spring to control the entry speed of the cards, it may be suitably flanked by resilient members of proper flexural strength to reduce the kinetic energy of the incoming cards thereby to prevent impact damage.

A still further alternative construction would be to anchor the deflector plate 45 only at its uppermost end and to construct it of sufficiently resilient material to permit the plate to serve in the dual capacity of a card deflecting member as well as the deflectable means for moving the clutch actuating plunger 49. In the light of the foregoing specification this modification is obvious and is therefore not illustrated.

As to each embodiment, it will be appreciated that, by the simple but novel expedient of utilizing a helical spring clutch escapement to provide controlled release of a gravitationally biased or other suitably powered tray, there is produced a card stacking device of simplicity, improved sensitivity and control and one which is directly and immediately responsive to the actual storage requirements of cards being stacked.

Although the invention has been described with particular reference to specific practice and embodiments, it will be understood by those skilled in the art that the apparatus of the invention may be changed and modified without departing from the essential scope of the invention, as defined in the appended claims.

We claim:

1. In high speed card handling apparatus, the combination comprising: a card receiving structure supported for gravitational movement along a downwardly inclined path; means for delivering cards individually to said card-receiving structure; holding means with respect to which said card-receiving structure moves; means interposed between said card-receiving structure and said holding means comprising means cooperating with said card-receiving structure to hold it against gravitational movement and a friction spring member releasably locking said last mentioned means to said holding means; means deflectably movable by cards accumulating in said structure; and means coupling said deflectable means to said spring member in such manner as normally to provide for holding said structure against gravitational movement and effective, in response to movement of said deflectable means, to release said structure for incremental gravitational advance to positions of progressively increasing card storage capacity.

2. In high speed card handling apparatus, the combination comprising: a card receiving structure arranged for gravitational movement along a downwardly inclined path; means for delivering cards continuously and sequentially to said card-receiving structure; holding means with respect to which said card-receiving structure moves; means interposed in mechanical connection between said holding means and said card-receiving structure comprising an element engageable with said tray to hold it against gravitational movement and a friction spring member releasably locking said element to said holding means; means pivotable by cards accumulating in said structure; and means coupling said pivotable means to said spring member and effective, in response to movement of said pivotable means to release said structure for incremental gravitational advance to positions of progressively increasing card storage capacity.

3. In high speed card handling apparatus, the combination comprising: a card receiving tray arranged for gravitational movement along a downwardly inclined ramp; means for delivering cards individually and at high translational speed to said tray; holding means with respect to which said tray moves; means interposed in mechanical connection between said holding means and said tray comprising means engageable with said tray to hold it against gravitational movement and a friction spring member releasably locking said last mentioned means to said holding means; and means movable by cards accumulating in said tray and effective, in response to movement of said movable means, to release said spring member to permit incremental gravitational advance of said tray into positions of progressively increasing card storage capacity.

4. In card handling apparatus, the combination comprising: a downwardly inclined ramp; a card receiving tray arranged to gravitate down said ramp; means for delivering cards continuously and sequentially to said tray; holding means with respect to which said tray moves; means interposed in a connection between said holding means and said tray comprising an element engageable with said tray to hold it against gravitational movement and a friction spring member releasably locking said element to said holding means; and card sensing means effective, in response to card build up, to release said spring member to permit incremental gravitational advance of said tray down said ramp to positions of progressively increasing card storage capacity.

5. In card handling apparatus, the combination comprising: card receiving structure adapted for movement along a predetermined path; means for continuously delivering cards to said structure; holding means with respect to which said card receiving structure moves; means interposed in a connection between said holding means and said card-receiving structure comprising means mechanically engageable with said tray to hold it against movement along the mentioned path and a friction spring member releasably locking said last mentioned means to said holding means; and sensing means movable by cards accumulating in said structure and coupled to said spring member to release said structure for incremental advance to positions of progressively increasing card storage capacity, in response to movement of said sensing means.

6. In high speed card handling apparatus, the combination comprising: a card receiving tray adapted for movement along a predetermined path; means for delivering cards individually and at high translational speeds to said tray; anchorage means with respect to which said tray moves; means for moving said tray along said path; means interposed in mechanical connection between said anchorage means and said tray comprising means engageable with said tray to hold it against movement along said path and a friction spring member releasably locking said last mentioned means to said anchorage means; and sensing means activatable by cards accumulating in said tray and coupled to said spring member to effect intermittent release of said tray for incremental advance along said path, to positions of progressively increasing card storage capacity, in direct response to the activation of said sensing means and movement of said tray.

References Cited in the file of this patent

UNITED STATES PATENTS

| | | |
|---|---|---|
| 2,262,236 | Huck | Nov. 11, 1941 |
| 2,872,190 | French | Feb. 3, 1959 |